US007164956B2

(12) United States Patent
Bicknell et al.

(10) Patent No.: US 7,164,956 B2
(45) Date of Patent: Jan. 16, 2007

(54) REMOTE OPERATION MANAGEMENT SYSTEM

(75) Inventors: William Hull Bicknell, Louisville, KY (US); Donald Richard Dickerson, Jr., Louisville, KY (US); Stephen James West, Louisville, KY (US)

(73) Assignee: General Electric Company, Schenectady, NY (US)

( * ) Notice: Subject to any disclaimer, the term of this patent is extended or adjusted under 35 U.S.C. 154(b) by 191 days.

(21) Appl. No.: 10/610,132

(22) Filed: Jun. 30, 2003

(65) Prior Publication Data

US 2004/0267383 A1 Dec. 30, 2004

(51) Int. Cl.

*G05B 15/00* (2006.01)
*G06F 19/00* (2006.01)
*G08C 25/02* (2006.01)
*F25B 49/00* (2006.01)
*G05B 19/18* (2006.01)
*G05B 11/01* (2006.01)

(52) U.S. Cl. .......................... 700/83; 700/169; 700/65; 700/66; 700/19; 714/748; 62/127

(58) Field of Classification Search .................. 700/65, 700/19, 66, 169, 83; 62/127; 714/748; 709/237
See application file for complete search history.

(56) References Cited

U.S. PATENT DOCUMENTS 3,858,181 A 12/1974 Goldsby
5,061,668 A 10/1991 Hoxmeier
5,091,713 A * 2/1992 Horne et al. ................ 340/541
5,225,977 A 7/1993 Hooper
5,345,379 A 9/1994 Brous
5,386,362 A 1/1995 Keret
5,390,385 A 2/1995 Beldham
5,424,940 A 6/1995 Ousborne
5,570,085 A 10/1996 Bertsch
5,586,174 A 12/1996 Bogner
5,673,190 A 9/1997 Kahleck
5,694,323 A * 12/1997 Koropitzer et al. ......... 705/400
5,757,643 A 5/1998 Kuroda
5,777,895 A 7/1998 Kuroda
5,799,281 A * 8/1998 Login et al. .................... 705/1
5,859,778 A * 1/1999 Kuroda et al. .............. 700/169
6,397,126 B1 * 5/2002 Nelson ........................ 700/236
6,453,687 B1 * 9/2002 Sharood et al. ............... 62/127
6,694,470 B1 * 2/2004 Palm .......................... 714/748

OTHER PUBLICATIONS

"iSeries iLD Big Display",www.newportus.com/l, p. 7, Lines 1 and 12.*
Data Encryption Standard, Federal Information Processing Standard Publication, Oct. 25, 1999.*

* cited by examiner

*Primary Examiner*—Anthony Knight
*Assistant Examiner*—Sunray Chang
(74) *Attorney, Agent, or Firm*—Armstrong Teasdale LLP

(57) ABSTRACT

A remote operation management system for commercial appliances is provided. The system includes a user interface for authorizing use of an appliance and a dedicated appliance controller coupled to the user interface and the appliance for controlling operation of the appliance. An appliance communication controller is coupled to the user interface over an appliance communication connection, and an external host controller is coupled to the appliance communication controller over a host communication connection. The external host controller is configured to communicate a message for the appliance to the appliance communication controller. A remote management system is coupled to the external host controller and configured to control a function of the appliance.

22 Claims, 9 Drawing Sheets

REMOTE OPERATION MANAGEMENT SYSTEM

BACKGROUND OF THE INVENTION

The present invention generally relates to an appliance control system, and in particular relates to a remote system for operational management of a commercial appliance.

In a commercial appliance enterprise such as a coin operated laundry, operational management is typically accomplished by physically accessing each machine to recover the cash contained within. With the more recent development of Debit Card technology and such systems as Laundry Management Systems, an operator is able to eliminate and/or coin handling issues and obtain a more detailed accounting of the machine usage. Acquiring the appliance accounting information is typically accomplished by accessing the appliance's respective user interface connected through a dedicated local area network, infrared (IR) communication port, or by manually gathering the data onto a management card for later retrieval.

BRIEF DESCRIPTION OF THE INVENTION

In one aspect, a remote operation management system for commercial appliances is provided. The system includes a user interface for authorizing use of an appliance and a dedicated appliance controller coupled to the user interface and the appliance for controlling operation of the appliance. An appliance communication controller is coupled to the user interface over an appliance communication connection, and an external host controller is coupled to the appliance communication controller over a host communication connection. The external host controller is configured to communicate a message for the appliance to the appliance communication controller. A remote management system is coupled to the external host controller and configured to control a function of the appliance.

In another aspect, a method for remotely reconfiguring an appliance is provided. The method includes generating an upgrade message at a remote system, transmitting the upgrade message from the remote system to an external host controller in a building housing the appliance, and transmitting the upgrade message from the external host controller to an appliance communication controller. The message is then transmitted from the appliance communication controller to a dedicated appliance controller via a user interface, followed by upgrading the dedicated appliance controller using the upgrade message.

DETAILED DESCRIPTION OF THE INVENTION

Although the collection of data at a commercial appliance enterprise, such as a laundry is readily accomplished, any further data analysis at a remote location requires additional equipment and procedures to transfer the data to the remote location.

Modern appliances are much more sophisticated than their early counterparts, and often include microcontrollers or microprocessors that allow the appliance to be programmed, reprogrammed, and provide diagnostic information, as examples. The Internet has given rise to worldwide connectivity for many types of devices. Appliances, however, only have traditional standalone capability. Three primary communication technologies may be used to provide appliance connectivity: hard wiring, power line carrier (PLC), and wireless.

Hard wiring (including for example RS-232, RS-485, Ethernet, USB, HomePNA, and industrial twisted pair networks) offers superior performance capability (when measured in terms of speed, noise immunity, and the like) at an effective cost. However, a drawback is that additional wiring is required to a home or business. Hard wiring thus poses the significant problem of retrofitting networked appliances into existing homes and businesses and increases cost for new structures.

PLC uses a 120V or 240V AC power line as a carrier for networking data by modulating the networking data on a high frequency carrier. The high frequency carrier is usually between 100–400 kHz to keep it below the range of FCC regulation. Although older technologies, such as X10, have achieved some market acceptance in lighting applications, they are generally deemed too slow and unreliable for major appliance networking needs. However, newer PLC technologies, such as CEBus and LonWorks, are now commercially available and provide improved data rates and noise immunity at reasonable cost.

Wireless technologies (such as IEEE 802.11, Bluetooth, HomeRF, and the like) solve the problem of additional wiring by modulating data onto a radio frequency carrier (e.g., at 2.4 GHz) that is broadcast via antenna to desired recipients. Wireless approaches may offer higher bandwidth than PLC technologies currently available, but they do so at a higher cost. Furthermore, since most major appliances are packaged in a sheet steel enclosure (which makes an effective RF shield), antenna placement may be difficult. Cost effective wireless technologies are also subject to distance limitations, potential interference, and poor reception zones that can often render their use ineffective.

Figure 1:
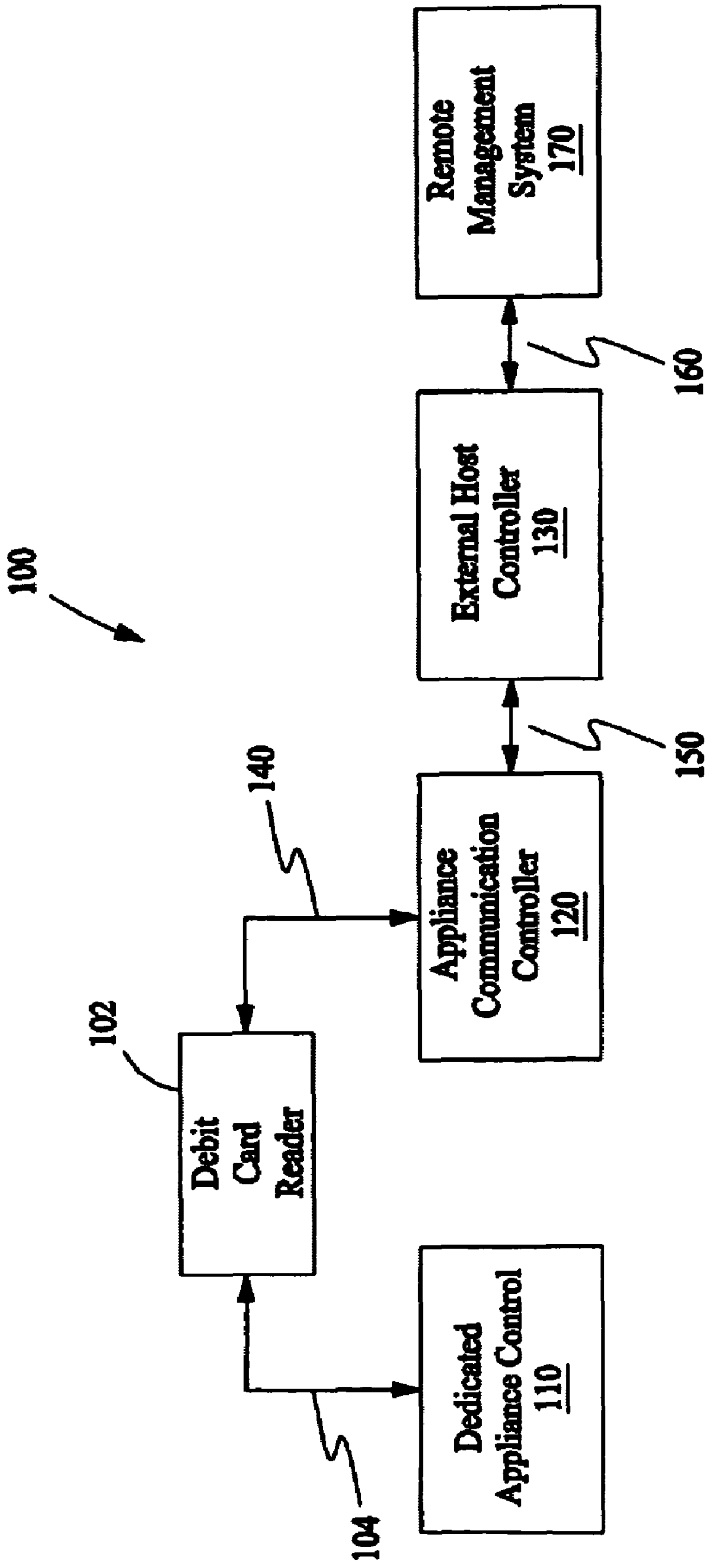
FIG. 1 illustrates an exemplary remote operation management system for an appliance.

FIG. 1 illustrates an exemplary remote operation management system 100 for an appliance. The remote operation management system 100 includes a user interface, which in one embodiment is a Debit Card Reader (DCR) 102, a Dedicated Appliance Controller (DAC) 110, an Appliance Communication Controller (ACC) 120, and an External Host Controller (EHC) 130, and a Remote Management System (RMS) 170. The DAC 110 and the DCR 102 are connected via a dedicated local communication interface 104. DCR 102 and ACC 120 are connected via an appliance communication connection 140 (e.g., a serial connection). EHC 130 and ACC 120 are connected via an appliance communication bus 150 (e.g., a PLC connection), while EHC 130 is connected to RMS 170 via an external high speed connection 160 (e.g., an internet connection). EHC 130 may be, as examples, a personal computer, laptop computer, remote control operating center, dedicated service tool, and the like.

Figure 2:
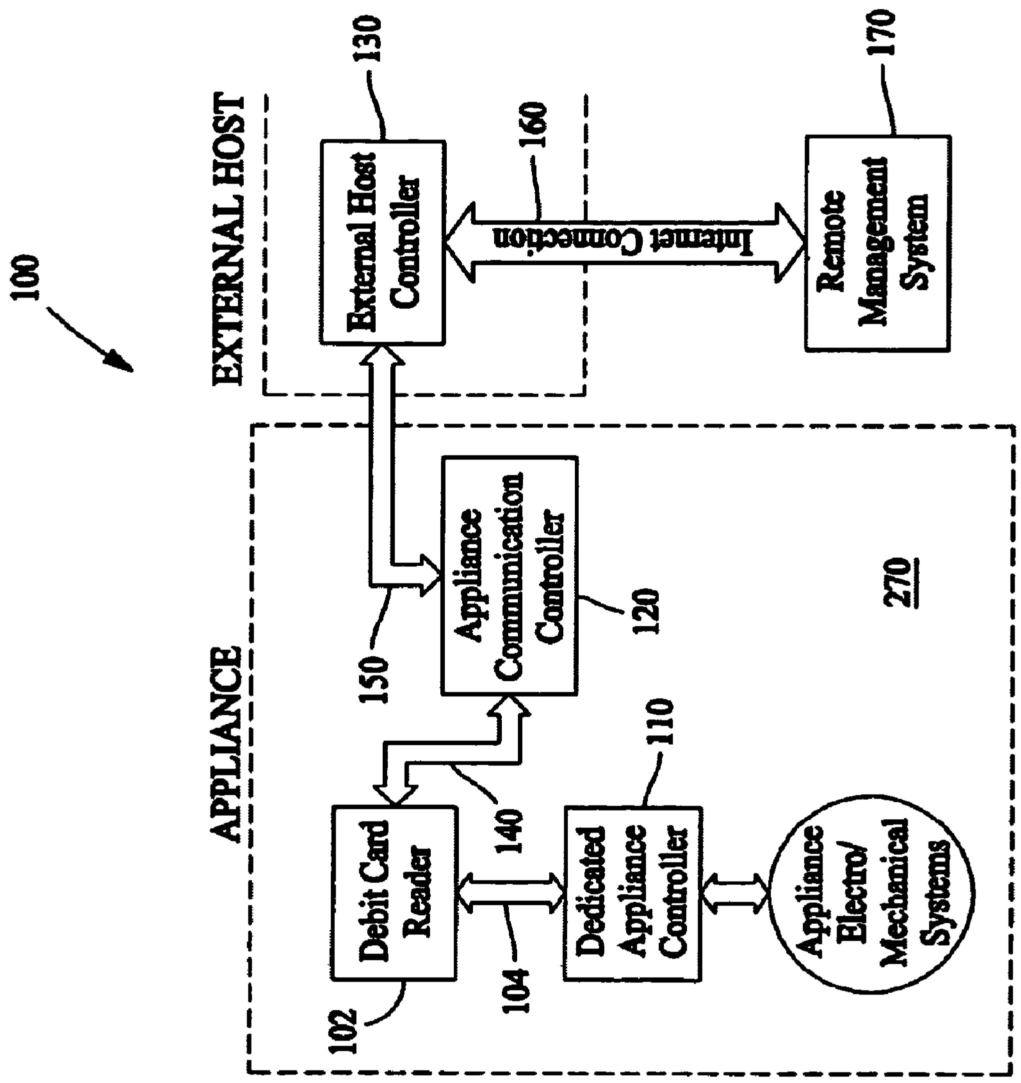
FIG. 2 illustrates an appliance controlled by a remote operation management system.

FIG. 2 illustrates an appliance 270 controlled by remote operation management system 100. DCR 102, DAC 110 and ACC 120 are, in one embodiment, contained within appliance 270 (e.g., a washer, refrigerator, oven, stove, air conditioner, heater, and the like). EHC 130 may be located anywhere that provides communication connection 150 (e.g., a PLC connection) and high speed connection 160 (e.g., to the Internet via modem, network card, and the like).

In an exemplary embodiment, remote operation management system 100 is used to manage a laundromat. In this embodiment of remote operation management system 100, there is one DCR 102, one DAC 110, and one ACC 120 for each appliance to be managed. Multiple appliances can be connected to EHC 130 via appliance communication bus 150. Typically, there is one EHC 130 per location. In one embodiment of EHC 130 serves as a secure gateway to the appliances and as a local communication transceiver. EHC 130 may also be used to as a command interpreter. RMS 170 is physically locatable anywhere there is access to an internet connection 160.

In a typical laundromat operation, DCR 102 has master control of the operation of appliance 270. Once the user has satisfied the financial requirement of DCR 102, machine control is typically passed to DAC 110 to execute the appliance operating functions. In an "off-line" mode appliance 270 is fully capable of functioning with just DCR 102 and DAC 110. In one embodiment, DCR 102 is used to store vend price, process transactions, and also retain specific details on the usage of appliance 270.

In an exemplary embodiment for "on-line" operation, operational information for appliance 270 is communicated to RMS 170 from DCR 102 beginning with communication link 140 between DCR 102 and ACC 120 which is typically a serial connection and which forms a first part of the path to RMS 170. Data from ACC 120 is transmitted over appliance communication bus 150 through EHC 130 and then finally back to RMS 170 via network connection 160.

Figure 3:
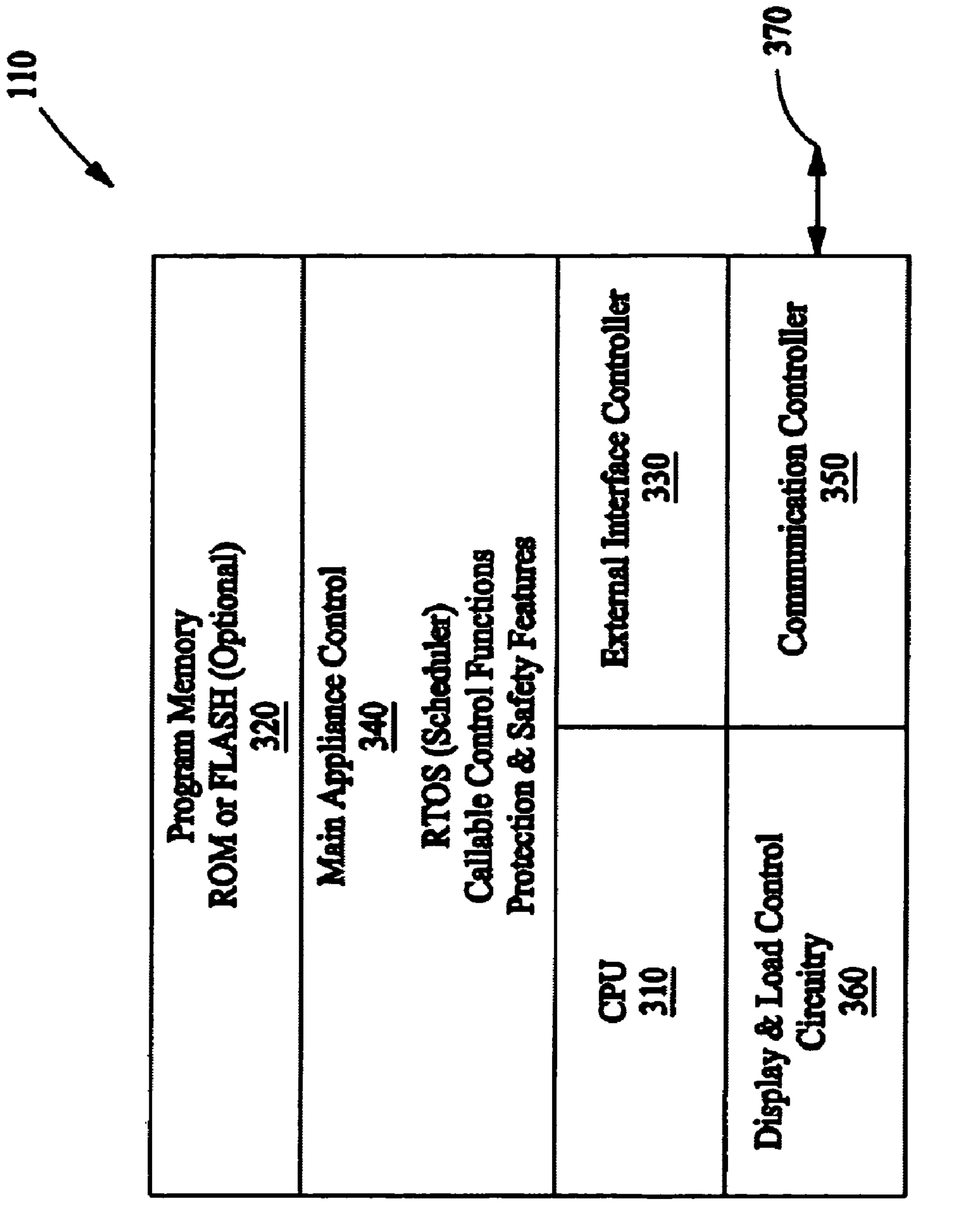
FIG. 3 illustrates a dedicated appliance controller.

DAC 110 functions primarily as an appliance controller and, in one embodiment, is implemented as shown in FIG. 3. As illustrated in FIG. 3, DAC 110 includes a central processing unit (CPU) 310, local memory 320 RAM (random access memory) and ROM (read-only memory) (optionally implemented as reprogrammable FLASH memory), at least one external interface controller 330 (e.g., connected to appliance relays, sensors, and the like), and an application program 340. External interface 330 provides a means to interface to other semi-autonomous sub-systems (e.g., a variable speed drive) present in an appliance. Application program 340 includes a scheduler, callable control functions, and protection and safety features. Application program 340 provides for the fundamental appliance specific operation such as cooking timing, wash cycle operation, and the like.

DAC 110 may also accept modifications to its operating functions and algorithms by reprogramming DAC 110 software 340. With the addition of a communication interface controller 350, DAC 110 may be reprogrammed or directed to perform specific functions via commands through command interface 350. DAC 110 also includes display and user input circuitry 360. Display and user input circuitry 360 provides for user interaction and operation of the appliance such as setting the appliance clock, selection of cycles and the like. DAC 110 communicates with ACC 120 via DCR 102 and communication link 370 (e.g., a serial communication bus).

Figure 4:
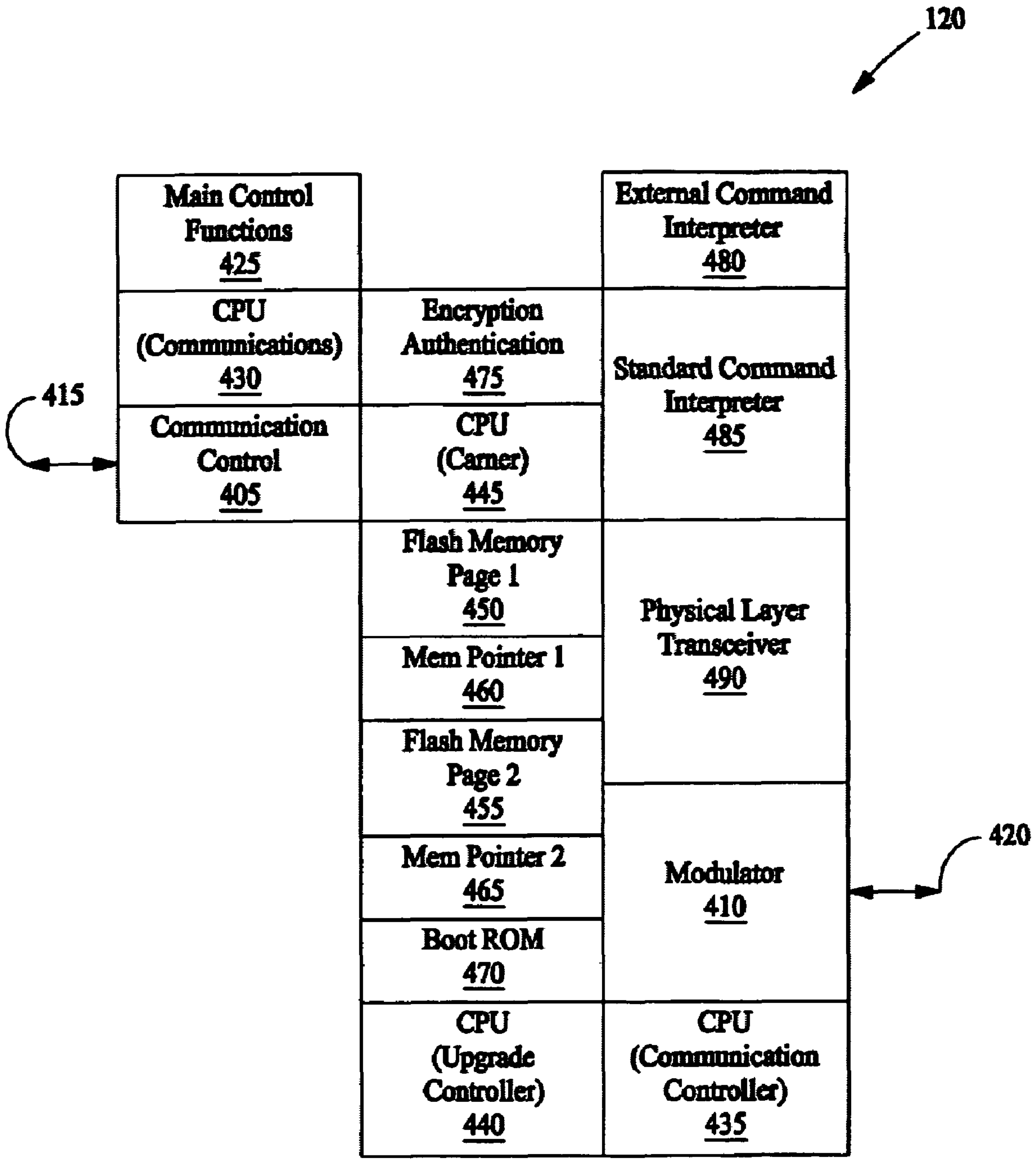
FIG. 4 illustrates an appliance communication controller.

ACC 120 serves as an interface between EHC 130 and DCR 102 and DAC 110. ACC 120 may also serve in other embodiments as a command interpreter, an information buffer, and a data translator. In one embodiment, and as illustrated in FIG. 4, ACC 120 includes two communications interfaces 405, 410. ACC 120 also includes a main control module 425, a communications CPU 430, a communication controller CPU 435, an upgrade controller CPU 440, and a data encryption CPU 445. ACC 120, in one embodiment, further includes a first page of Flash memory 450, a second page of flash memory 455, first page memory pointer 460, a second page memory pointer 465, and a Boot ROM 470. ACC 120 further includes an encryption authentication module 475, an external command interpreter 480, a standard command interpreter 485, and a physical layer transceiver 490. One or more of the functional blocks such as the main control function and encryption function may be combined into a single function. Also, one or more of the CPU functions such as the communication CPU and encryption CPU can be combined into a single CPU. The physical implementation of the above functional blocks can be accomplished in discrete devices or a single device such as a system on a chip or custom application specific integrated circuit (ASIC). Further, any of the controllers of FIG. 1 may be implemented as an ASIC. As used herein, the term controller is not limited to just those integrated circuits referred to in the art as controllers, but broadly refers to computers, processors, microcontrollers, microcomputers, programmable logic controllers, application specific integrated circuits, and other programmable circuits, and these terms are used interchangeably herein.

Main control module 425 provides for the scheduling and correct interoperation of all other functions and tasks in ACC 120. Main control module 425 may be implemented as a software module as part of the total firmware of ACC 120 or as a real time operating system such as UNIX, Windows CE, and the like. Communications CPU 430 provides for processing of the communication system instructions as well as digital signal processing functions to enhance the signal to noise ratio of the communicated data forwarded to DAC 110, Encryption CPU 445 running under encryption and authentication firmware module control 475, External Command Interpreter 480, and to Standard Command Interpreter 485. External Command Interpreter 480 and Standard Command Interpreter 485 may be combined into the same functional code. Communications CPU 430 may be implemented as a stand-alone device such as the H8-3644 as manufactured by Hitachi Corporation or as a comprehensive CPU or ASIC as mentioned above. Communication controller CPU 435 provides for the execution of the specific communication instructions as mentioned above. Communication controller CPU 435 may be implemented as a stand alone device such as the H8-3644 as manufactured by Hitachi Corporation, a digital signal processor TM5320C20 as manufactured by Texas Instruments or as part of a comprehensive CPU as mentioned above. Upgrade controller CPU 440 controls the sequence of steps that allow for the buffering and manipulation of the upgraded ACC microcode. Upgrade controller CPU 440 may be implemented as a stand-alone device such as the H8-3644 as manufactured by Hitachi Corporation or as part of an overall CPU as mentioned above.

Encryption CPU 445 provides for the data authentication and encryption function code execution. Encryption authentication module 475 verifies authenticity such as that provided by the Pretty Good Privacy (PGP) protocol for public key authentication and encryption of a transmitted message (for example, provided by Rijndael encryption code and alternatives). Encryption CPU 445 may be implemented as a stand-alone device such as the H8-3644 as manufactured by Hitachi Corporation or as part of a comprehensive CPU as mentioned above. Encryption authentication module 475 may be implemented as a stand-alone function or integrated into the firmware code. In an alternate embodiment, encryption CPU 445 and encryption authentication module 475 may be omitted to reduce cost and complexity.

External command interpreter 480 interprets commands received from an external host, then translates and sequences them to appliance specific commands. External command interpreter 480 may be implemented as a stand-alone module or integrated into the ACC firmware. The standard command interpreter 485 interprets and forwards the appliance specific commands by passing these commands to DCR 102, which forwards the commands to DAC 110. Standard command interpreter 485 performs a mapping function that in its most basic case is a one-to-one mapping. In an alternate embodiment the mapping function may be more complicated and include translation of command reference calls, command parameter duration, and the like. Standard command interpreter 485 may be implemented as a stand-alone module or integrated into the ACC firmware. In alternate embodiments, the external command interpreter may be omitted and only the standard command interpreter used where no further enhancement of the appliance functionality is desired. The external command interpreter may be omitted if the whole functionality of the DAC and ACC are upgraded and exchanged, making the external command interpreter unnecessary.

Physical layer transceiver 490 allows the translation of physical signals as received and transmitted by the ACC to logical signals. Physical layer transceiver 490 may be implemented as a stand-alone device such as RS232 transceiver or integrated into the overall ACC functionality (for example, in an ASIC).

Communication connection 405 provides a serial connection 415 between ACC 120 and DCR 102. In one embodiment, serial connection 415 implements certain aspects of a serial communication bus standard, as described below. Communication connection 410 includes an external communication link 420, for example, a power line carrier.

Serial connection 415 may be implemented, for example, as a serial communication bus interface between ACC 120 and DCR 102. Where there are multiple dedicated appliance controllers, serial bus 415 uses an arbitration scheme to allow all the devices to communicate over bus 415 without data transmission collisions, as explained below.

Communication link 420 between ACC 120 and EHC 130 may be implemented in many forms, such as power line carrier (PLC), infrared (IR), IEEE 802.11, hardwire, and the like. In an exemplary embodiment, communication link 420 is implemented as a power line carrier interface. ACC 120 may mitigate data interruption through retention of information, such as status and completeness of data transfers over communication link 420. Alternatively, large data transmissions (such as a new operational program) may be verified via a CRC (cyclic redundancy check) or checksum test. If a data interruption occurs, the entire data packet may be retransmitted. In one embodiment, communication link 420 supports multiple devices, such as refrigerator, laundry, and cooking appliances and the like.

ACC 120 acts as a command interpreter for data from the gateway EHC 130. ACC 120 accepts low level functions (such as On, Off, Status, Functions Selection, and the like). Low level commands or functions allow direct control of the appliance. ACC 120 communicates the low-level functions to DCR 102 for transmission to DAC 110. Some functions may be converted into a machine specific format or native appliance command set before being transmitted to DCR 102 and on to DAC 110 (e.g., functions for activation and deactivation of a water valve solenoid). In an alternative embodiment, ACC 120 is employed as an extended command interpreter. As an extended command interpreter, ACC 120 may implement new algorithms and/or functions by using low-level commands as building blocks to perform new functions.

ACC 120 may also act as an information (program) buffer to reprogram DAC 110. ACC 120 receives a new appliance control program via the high bandwidth communication link. The new appliance control program is stored into a memory page in ACC 120. Once the new appliance control program has been received, the program is verified for correctness. ACC 120 then checks the status of DAC 110, via DCR 102, to insure no upgrading occurs during use of the appliance. If the appliance is not in use, ACC 120 may begin transmitting the new program through DCR 102 to DAC 110. During the transmission process, ACC 120 retains a pointer indicating what part of the program data is currently being transmitted. Retaining a pointer allows for interruption and resumption of the data transmission without having to retransmit the entire program.

ACC 120 may also function as a data translator. ACC 120 may obtain, correlate, and track statistics with respect to the operation of the appliance(s) to which it is connected. The statistics obtained from the appliance(s) may be used for maintenance purposes (such as scheduling maintenance). The statistics may also be used to track usage of appliances or for financial accounting purposes. The statistics are, in one embodiment, accumulated by ACC 120 until the statistics are uploaded to a remote host for analysis. Alternatively, statistics may be stored on DCR 102.

In an alternative embodiment, ACC 120 may be employed as a master to DAC 110 (slave) controller. New control algorithms are retained and executed from within ACC 120, rather than being downloaded into DAC 110. ACC 120 issues commands instructing DAC 110 to activate the appropriate loads within the appliance. ACC 120 employs the functionality of DAC 110 as in some embodiments (such as DAC 110 sensors, load actuators, display capability, and the like). DAC's 110 normal safety and protection functions remain enabled to protect the appliance and the user. A high-speed communication bus allows efficient communication between ACC 120, DCR 102, and DAC 110.

Figure 5:
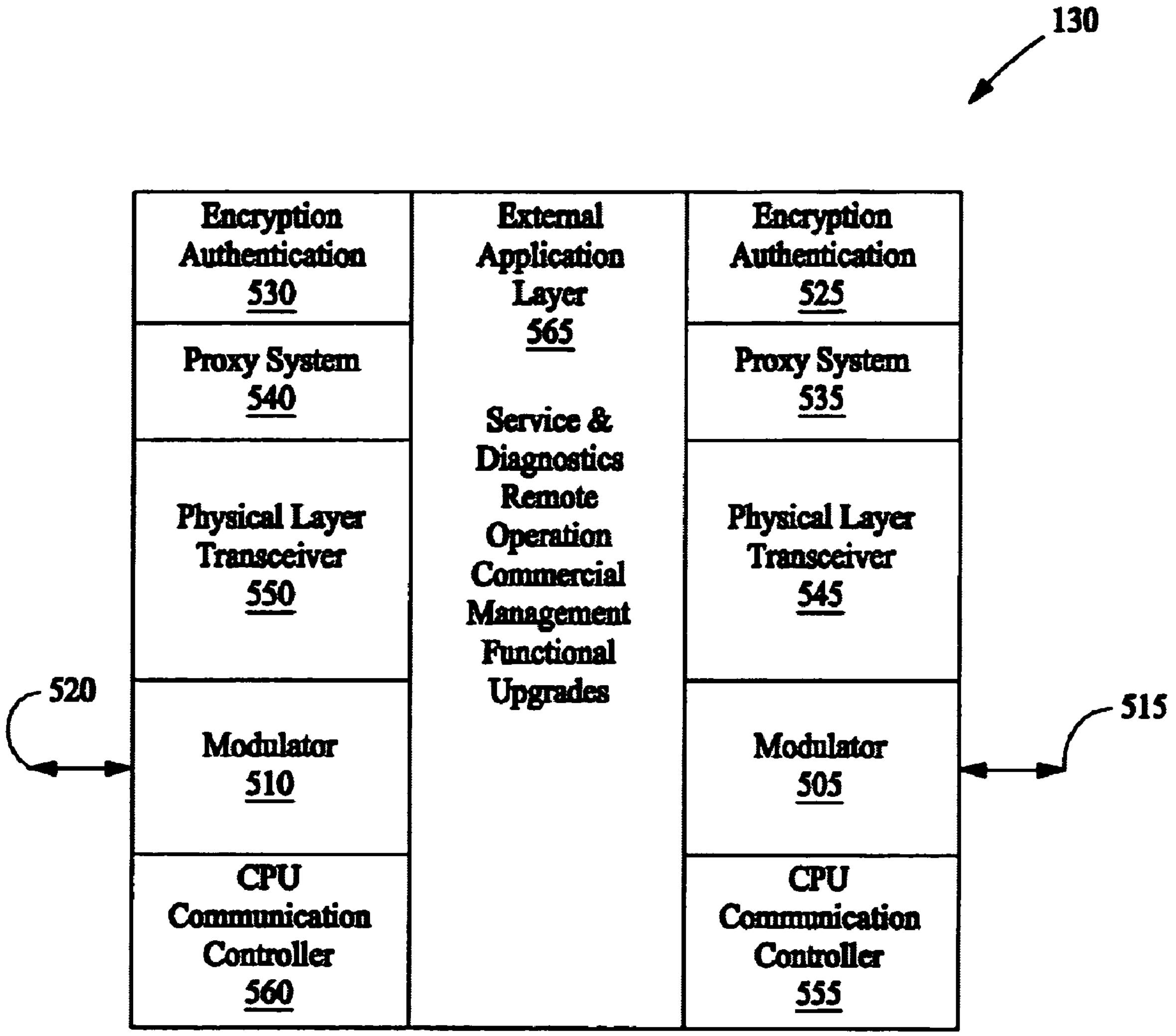
FIG. 5 illustrates an external host controller.

FIG. 5 illustrates an implementation of an external host controller (EHC) 130. EHC 130 includes the modulators 505, 510 and communication connections 515, 520. EHC 130 further includes encryption authentication modules 525, 530, proxy systems 535, 540, physical layer transceivers 545, 550, and CPU communication controllers 555, 560. EHC 130 further includes an external application layer 565. External application layer 565 allows service and diagnostics, remote operation, management, function, and upgrades. External application layer 565 may be implemented as a stand alone module or part of the external home automation system such as the X10 home automation code as provided by X10 Activehome available at www.x10.com.

Communication controller CPU 555, 560 provides for the execution of the specific communication instructions as mentioned above. Communication controller CPU 555, 560 may be implemented as a stand alone device such as the H8-3644 as manufactured by Hitachi Corporation, a digital signal processor TMS320C20 as manufactured by Texas Instruments or as part of a comprehensive CPU combining elements 555 and 560. Physical layer transceiver 545, 550 performs translation of physical signals as received and transmitted by EHC 130 to logical signals. Physical layer transceiver 545, 550 may be implemented as a stand-alone device such as RS232 transceiver or integrated into the overall ACC functionality via an ASIC. Proxy systems 535, 540 may be implemented as a proxy server providing an address translation service, thus expanding a single logical address to multiple physical addresses, for example, in a manner consistent with Internet Protocol systems. Encryption CPU 445 provides data authentication and encryption function code execution. Encryption authentication module 475 verifies the authenticity such as provided by the PGP protocol for public key authentication and encryption of a transmitted message (for example, according to Rijndael encryption code and alternatives). Encryption CPU 525, 530 may be implemented as a stand-alone device such as the H8-3644 as manufactured by Hitachi Corporation or as part of a comprehensive CPU as noted above. Encryption authentication module 525, 530 may be implemented as a stand-alone function or integrated into the firmware of EHC 130. It is understood that in an alternate exemplary embodiment, encryption CPU 525 or 530 and corresponding encryption authentication module 525 or 530 may be omitted.

Communication connection 505 provides a communication link 515 to external devices. Communication link 515 may be a modem connection, hardwire, wireless, and the like. Communication connection 510 provides a communication link 520 between EHC 130 and ACC 120. Communication link 520 between ACC 120 and EHC 130 may be implemented in many forms, such as power line carrier (PLC), infrared (IR), IEEE 802.11, hardwire, and the like.

Communication link 520 includes a power line carrier interface. ACC 120 may mitigate data interruption through retention of information, such as status and completeness of data transfers over communication link 520. Alternatively, large data transmissions (such as a new operational program) may be verified via a CRC (cyclic redundancy check) or checksum test. If a data interruption occurs, the entire data packet may be retransmitted. In one embodiment, communication link 520 supports multiple laundry devices.

In one embodiment, EHC 130 incorporates a transceiver to communicate with at least one appliance via host communication connection 150. In a standalone embodiment, EHC 130 may generate instructions to operate an appliance. Standalone EHC 130 also may generate instructions to modify the control of an appliance. In a standalone embodiment, EHC 130 includes a user interface. The user interface allows user friendly appliance control from a single location. The user interface may be implemented as Windows Application as provided by the X10 Activehome system mentioned above. In an alternative embodiment, EHC 130 further includes a second high-speed communication port for remote communication. EHC 130 may act as a gateway to external networks, including the Internet. In an exemplary embodiment, a remote system 170 may access EHC 130. Data encryption algorithms and proxy protocols may be used for remote communication with EHC 130. Remote communication allows remote diagnostics and remote function upgrade from a facility such as a factory producing the appliance, authorized service center, and the like. In one embodiment, a power line carrier (PLC) is used to transmit data over an AC power line.

In an exemplary embodiment, data is transmitted by modulating the data on a high frequency carrier above the power line carrier. In one embodiment, the modulated data is a sinusoid wave that is transmitted along with AC power through the power lines. The high frequency carrier is usually between 100–400 kHz to keep it below the range of FCC regulation. Example PLC implementation include the X10 and CEBUS protocols as well known in the art.

Figure 6:
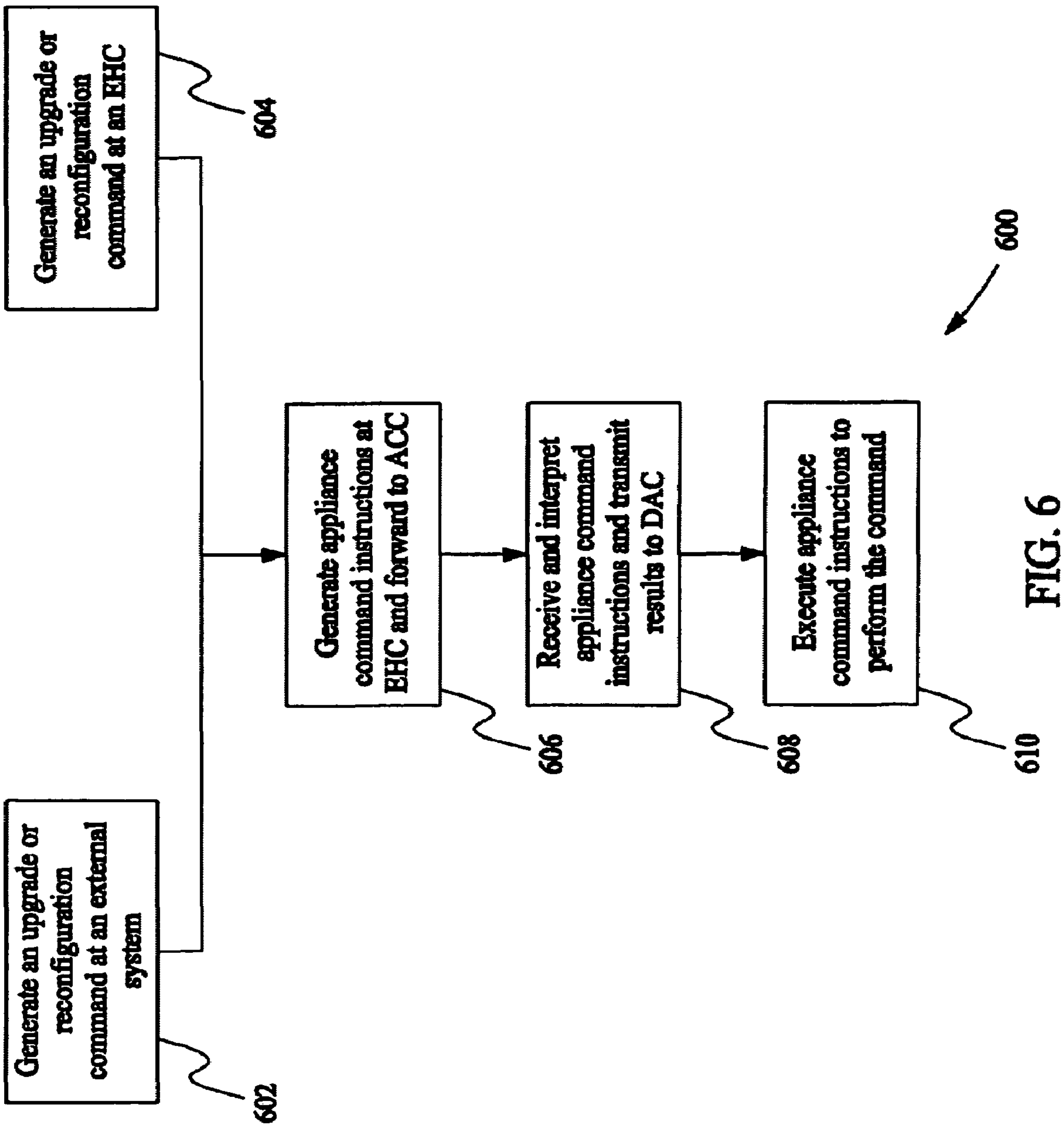
FIG. 6 illustrates a flow diagram of a method for reconfiguring an appliance.

FIG. 6 presents a flow diagram 600 of a method for reconfiguring an appliance. To reconfigure a machine, a new machine instruction block is transmitted from EHC 130 to DAC 110. The user requesting to reconfigure the machine has access to either an application program that generates the new machine instructions or a machine manufacturer generated machine code file containing the new machine instructions. EHC 130 sends messages to ACC 120 and DAC 110 to reconfigure the appliance.

In an exemplary embodiment, upgrade messages are generated as indicated at 602 by RMS 170 and sent to EHC 130. Alternatively, upgrade messages may be generated at EHC 130 as indicated at 604. To execute a machine reconfiguration, EHC 130 establishes a communication link to the appropriate ACC 120. ACC 120 validates the request employing known authentication protocols. Once the reconfiguration request is validated, EHC 130 transmits the new machine instruction block to ACC 120 as indicated at 606. If the reconfiguration request is not seen as a valid request, ACC 120 returns an error response to EHC 130.

During the machine instruction block transfer process to ACC 120, the new instructions are stored into one of the memory pages shown in FIG. 4, for example. A pointer is incremented to retain the location of the most recent information loaded into the memory page thereby monitoring the progress of the instruction transfer. In case of a data transmission error, the pointer can be used to identify where in the machine instruction block the data transmission should resume. The progress information is transmitted back to EHC 130 as part of an error recovery protocol. Following the completion of the downloading of the machine instruction block to ACC 120, the ACC verifies that the data is correct via a CRC, checksum, or other error checking mechanism as indicated at 608. If the machine instruction block is found to be in error, ACC 120 requests a retransmit of the machine instruction block from EHC 130. Otherwise, ACC 120 establishes a communication link to the DCR 102 and DAC 110.

Once the communication link is established between ACC 120 and DCR 102, ACC 120 will request, through DCR 102, that DAC 110 enter into the program update mode. Once DAC 110 has acknowledged that it has transitioned to the program update mode, ACC 120 uploads the new machine instruction block to DCR 102 for delivery to DAC 110. During the upload procedure, ACC 120, in one embodiment, employs a pointer which will be incremented to retain the location of the most recent information loaded from the ACC memory page. In case of a data transmission error, the pointer may be used to identify the location in the machine instruction block from which data transmission should resume to minimize excessive data transmission.

After completion of the machine instruction block transmission, DAC 110 verifies the validity of the data via CRC, checksum, or the like. If an error is detected within the machine instruction block, a retransmit request is sent back to ACC 120 to resend the machine instruction block. If no errors are detected, DAC 110 stores the instruction block and acknowledges the transmission to ACC 120 as indicated at 610. The process continues until the upgrade is completed, at which time ACC 120 transmits a RESET command to DAC 110. Upon receipt of the RESET command, DAC 110 terminates the program upload mode and the new instructions are available on the appliance.

Figure 7:
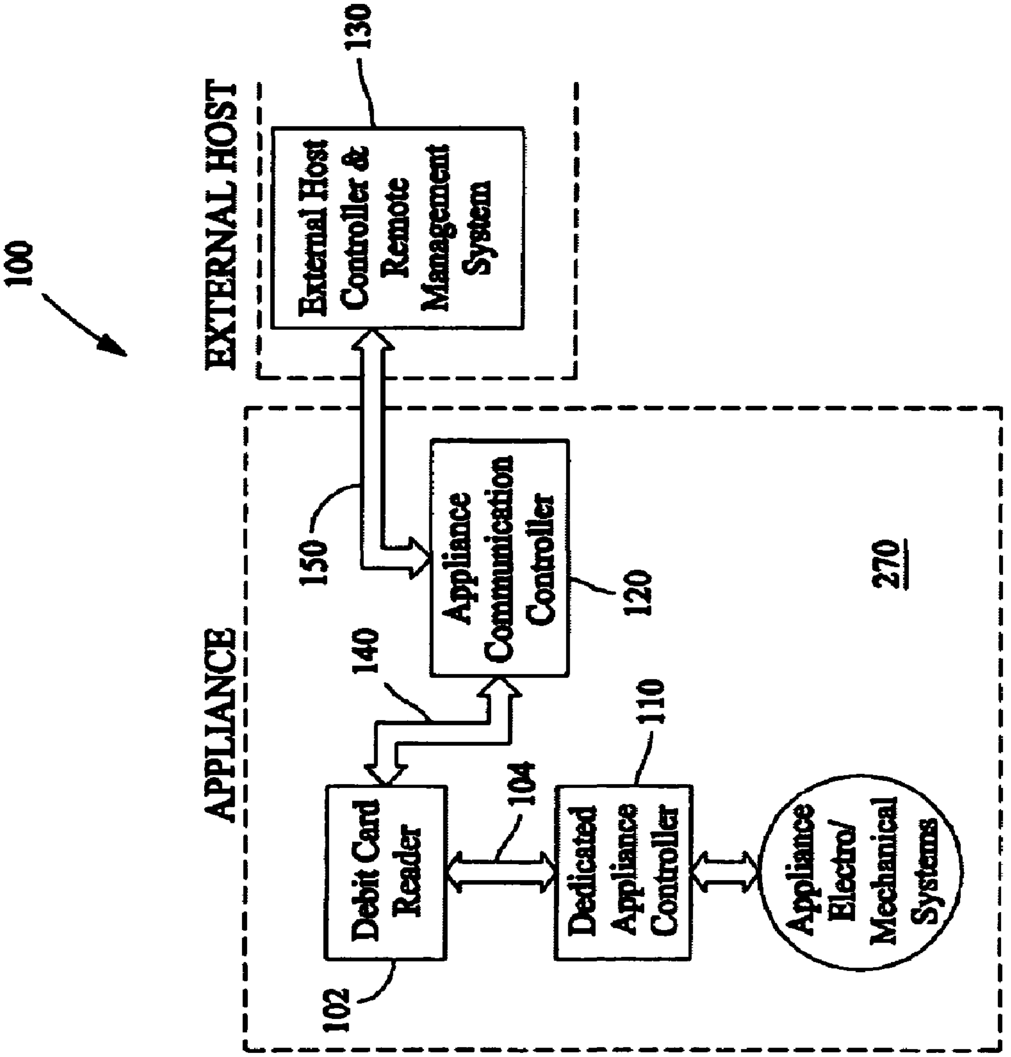
FIG. 7 illustrates an appliance controlled by an alternative embodiment of a remote operation management system.

FIG. 7 illustrates appliance 270 controlled by an alternative embodiment of a remote operation management system 100. In FIG. 3, EHC 130 is reconfigured to include the hardware/software capability of RMS 170 in addition to its normal functions. This configuration would be typical for a "closed" system or what is currently seen in most commercial facilities where an operator wishes to manage their equipment locally, thus removing the need for network connection 160.

Figure 8:
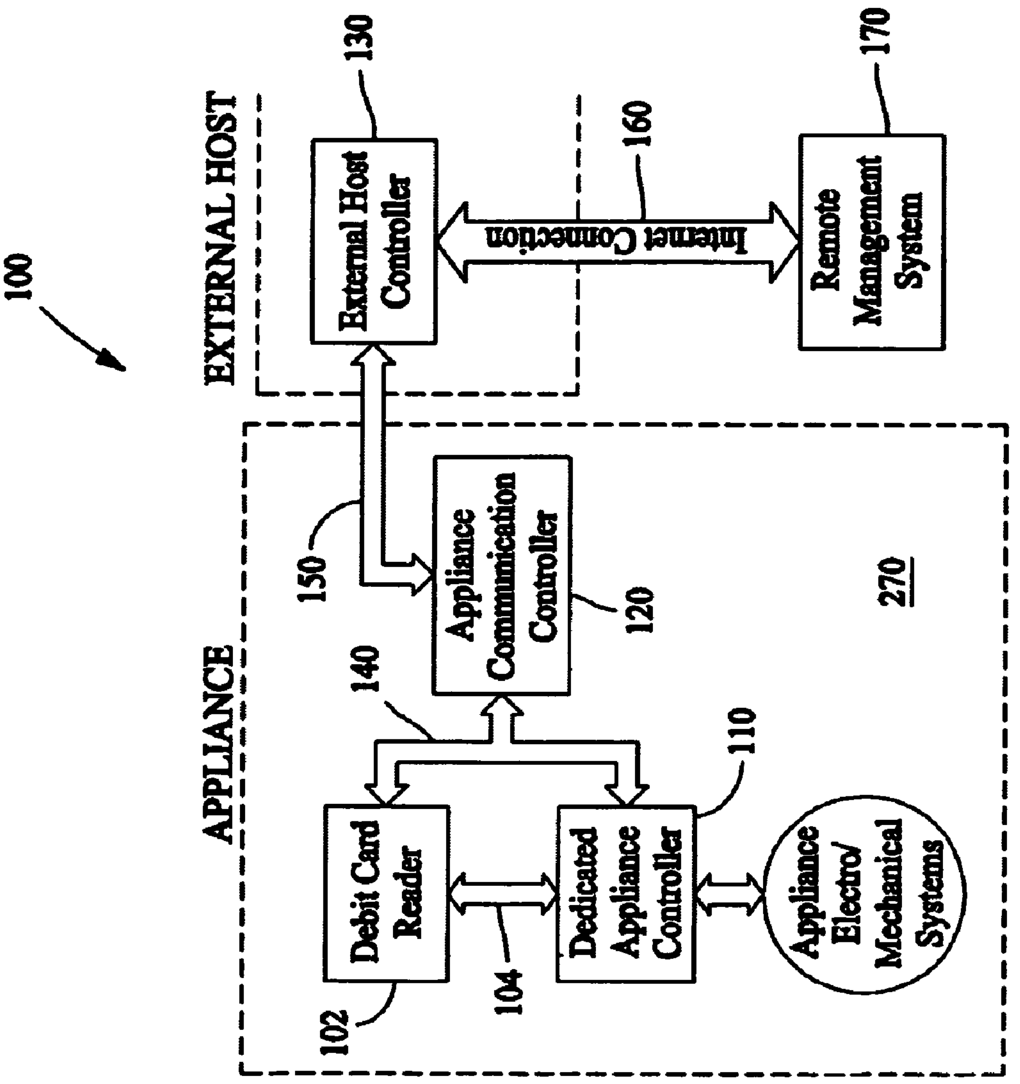
FIG. 8 illustrates an appliance controlled by another alternative embodiment of a remote operation management system.

FIG. 8 shows appliance 270 controlled by another alternative embodiment of remote operation management system 100. In the system of FIG. 4, ACC 120 is in direct communication with DAC 110. In this embodiment, appliance functional upgrades and diagnostics can be passed to DAC 110 without passing the information through DCR 102. Although this information could be passed through DCR 102, this embodiment simplifies the requirements placed upon the design of DCR 102.

Optionally, DCR 102 of the embodiments of FIGS. 2, 7, and 8 can be replaced with a bank card point of sale terminal. This would allow the operator to use a banking transaction system to perform funds transfers and also eliminate the need for maintaining a card system.

Figure 9:
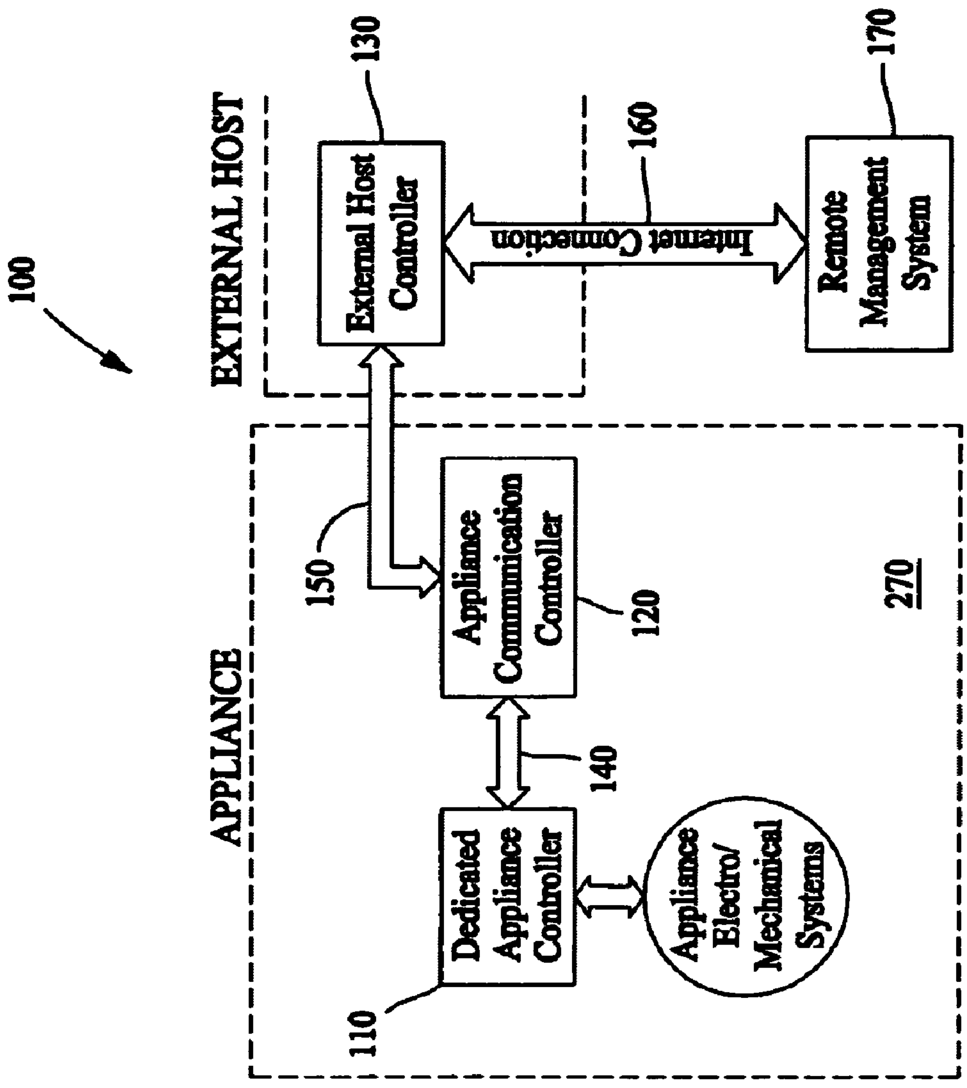
FIG. 9 illustrates an appliance controlled by a card independent remote operation management system.

FIG. 9 illustrates appliance 270 controlled by a remote operation management system 100 configured to support commercial applications that employ a Non-Coin Commercial machine. In this embodiment, ACC 120 communicates directly with DAC 110 via serial communication link 140. Appliance operation is paid for via a monthly fee collected by the operator. The operation of appliance 270 is restricted to authorized personnel who have been granted access by the operator. With the real time communication capability of RMS 170, the system can be configured such that DAC 110 communicates directly with ACC 120 and then to RMS 170. In this embodiment, the user can enter a Pin Number or identification code into a user interface. RMS 170 can then authorize the use of the appliance.

The above-described system provides a remote management system whereby the operator has the capability to manage multiple sites from one location. The system provides the capability to gather statistical information, adjust pricing, set usage thresholds, and perform usage balancing. The system also provides remote update and upgrade capability.

While the invention has been described in terms of various specific embodiments, those skilled in the art will recognize that the invention can be practiced with modification within the spirit and scope of the claims.

What is claimed is:

1. A remote operation management system for commercial appliances, comprising:

a user interface for authorizing use of an appliance;

a dedicated appliance controller coupled to said user interface and the appliance for controlling operation of the appliance;

an appliance communication controller coupled to said user interface over an appliance communication connection;

an external host controller coupled to the appliance communication controller over a host communication connection, the external host controller configured to communicate a message for the appliance to the appliance communication controller, said appliance communication controller configured to detect a data interruption over said host communication connection, said appliance communication controller configured to detect an operation status of said appliance for controlling upgrading of the appliance; and a remote management system coupled to said external host controller and configured to control a function of the appliance.

2. A system in accordance with claim 1, wherein said user interface passes control of the appliance to said dedicated appliance controller when use of the appliance is authorized.

3. A system in accordance with claim 1, wherein the appliance is operable in an off-line mode whereby the appliance is controlled only by said user interface and said dedicated appliance controller.

4. A system in accordance with claim 1, wherein said external host controller is coupled to more than one appliance.

5. A system in accordance with claim 1, wherein said appliance communication controller is coupled to both said user interface and said dedicated appliance controller.

6. A system in accordance with claim 1, wherein the host communication connection comprises a power line carrier communication connection.

7. A system in accordance with claim 1, wherein the appliance communication connection comprises a serial appliance communication connection.

8. A system in accordance with claim 1, wherein the dedicated appliance controller includes reprogrammable appliance control software.

9. A system in accordance with claim 1, wherein said user interface comprises a debit card machine.

10. A system in accordance with claim 1, wherein said user interface comprises a bank card machine.

11. A system in accordance with claim 1, wherein said user interface comprises a non-coin commercial machine.

12. A system in accordance with claim 1, system of claim 1 wherein the message is a dedicated appliance controller message.

13. A system in accordance with claim 1, wherein the message is a user interface message.

14. A system in accordance with claim 1, wherein at least one of the user interface and the appliance communication controller tracks statistics from the dedicated appliance controller.

15. A system in accordance with claim 1, wherein said management system comprises remote operation software.

16. A system in accordance with claim 1, wherein the external host controller comprises an external application layer for transmitting data to the at least one appliance communication controller.

17. A system in accordance with claim 16, wherein the external application layer comprises at least one of remote operation software, diagnostic software, and upgrade software.

18. A system in accordance with claim 1, wherein said external host controller is coupled to said remote management system via an Internet connection.

19. A method for remotely reconfiguring an appliance, the method comprising:

generating an upgrade message at a remote system;

transmitting the upgrade message from the remote system to an external host controller in a building housing the appliance;

transmitting the upgrade message from the external host controller to an appliance communication controller;

checking for a data interruption in the upgrade message;

detecting an operation status of the appliance at the appliance communication controller;

transmitting the upgrade message from the appliance communication controller to a dedicated appliance controller via a user interface and based on a detected operation status; and upgrading the dedicated appliance controller using the upgrade message.

20. A method in accordance with claim 19, wherein the upgrade message is transmitted to the appliance communication controller from the external host control using a power line carrier system.

21. A method in accordance with claim 19, wherein the upgrade message is transmitted to the user interface from the appliance communication controller using a serial connection.

22. A method in accordance with claim 19, wherein the upgrade message is transmitted from the remote system to the external host controller using an Internet connection.

* * * * *